US012581578B1

(12) United States Patent
Luo et al.

(10) Patent No.: US 12,581,578 B1
(45) Date of Patent: Mar. 17, 2026

(54) PROTECTION CIRCUIT FOR USE IN A LIGHTING CIRCUIT

(71) Applicant: SIGNIFY HOLDING B.V., Eindhoven (NL)

(72) Inventors: Chenghu Luo, Shanghai (CN); Lijun Zhou, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 410 days.

(21) Appl. No.: 18/274,776

(22) PCT Filed: Jan. 26, 2022

(86) PCT No.: PCT/EP2022/051709
§ 371 (c)(1),
(2) Date: Jul. 28, 2023

(87) PCT Pub. No.: WO2022/167279
PCT Pub. Date: Aug. 11, 2022

(30) Foreign Application Priority Data

Feb. 5, 2021 (WO) ................ PCT/CN2021/075623
May 10, 2021 (EP) ..................................... 21172929

(51) Int. Cl.
*H05B 45/50* (2022.01)
*H02H 9/06* (2006.01)

(52) U.S. Cl.
CPC ............... *H05B 45/50* (2020.01); *H02H 9/06* (2013.01)

(58) Field of Classification Search
CPC ................................... H05B 45/50; H02H 9/06
See application file for complete search history.

(56) References Cited

U.S. PATENT DOCUMENTS

| | | | | |
|---|---|---|---|---|
| 4,455,586 A | * | 6/1984 | McCartney .............. | H02H 9/06 |
| | | | | 361/111 |
| 8,339,055 B2 | * | 12/2012 | Zhan .................... | H05B 45/385 |
| | | | | 315/276 |
| 9,504,121 B2 | * | 11/2016 | Moon .................... | H05B 47/25 |
| 10,763,665 B2 | * | 9/2020 | Schneider ............. | H02H 9/041 |
| 10,855,075 B2 | * | 12/2020 | Hasegawa ................ | H02H 9/06 |
| 11,085,624 B2 | * | 8/2021 | Gielen .................... | F21V 23/06 |
| 2011/0299203 A1 | | 12/2011 | Ruess et al. | |
| 2014/0168833 A1 | | 6/2014 | Sesink | |
| 2016/0087424 A1 | * | 3/2016 | Skinner .................... | H02H 9/06 |
| | | | | 361/91.1 |
| 2016/0172848 A1 | * | 6/2016 | Skinner .................... | H01T 4/02 |
| | | | | 361/91.1 |

(Continued)

FOREIGN PATENT DOCUMENTS

| | | | | |
|---|---|---|---|---|
| CN | 110137933 A | * 8/2019 | .............. | H02H 9/04 |
| CN | 111276957 A | 6/2020 | | |

(Continued)

*Primary Examiner* — Adam D Houston

(57) ABSTRACT

A protection circuit is provided comprising a voltage clamping circuit and a discharge circuit connected between the voltage clamping circuit and the ground. The discharge circuit has, in series, a gas discharge tube component and a controllable voltage triggering circuit with a triggering threshold. A hi-pot test voltage is insufficient to trigger the voltage triggering circuit and a low current is conducted. A surge test voltage is sufficient to break down the voltage triggering circuit to provide a low voltage drop and a large current flows.

11 Claims, 7 Drawing Sheets

(56)                     References Cited

U.S. PATENT DOCUMENTS

| 2016/0204600 | A1 | | 7/2016 | Muehlschlegel | |
| 2022/0272813 | A1 | * | 8/2022 | Clark | .................... H02J 7/0024 |

FOREIGN PATENT DOCUMENTS

| JP | 2006191797 | A | * | 7/2006 | ............. H02H 9/044 |
| KR | 101539083 | B1 | * | 7/2015 | ............. H05B 47/10 |
| WO | WO-2021026351 | A1 | * | 2/2021 | ............. H05B 45/50 |
| WO | WO-2022167279 | A1 | * | 8/2022 | ............... H02H 9/06 |

\* cited by examiner

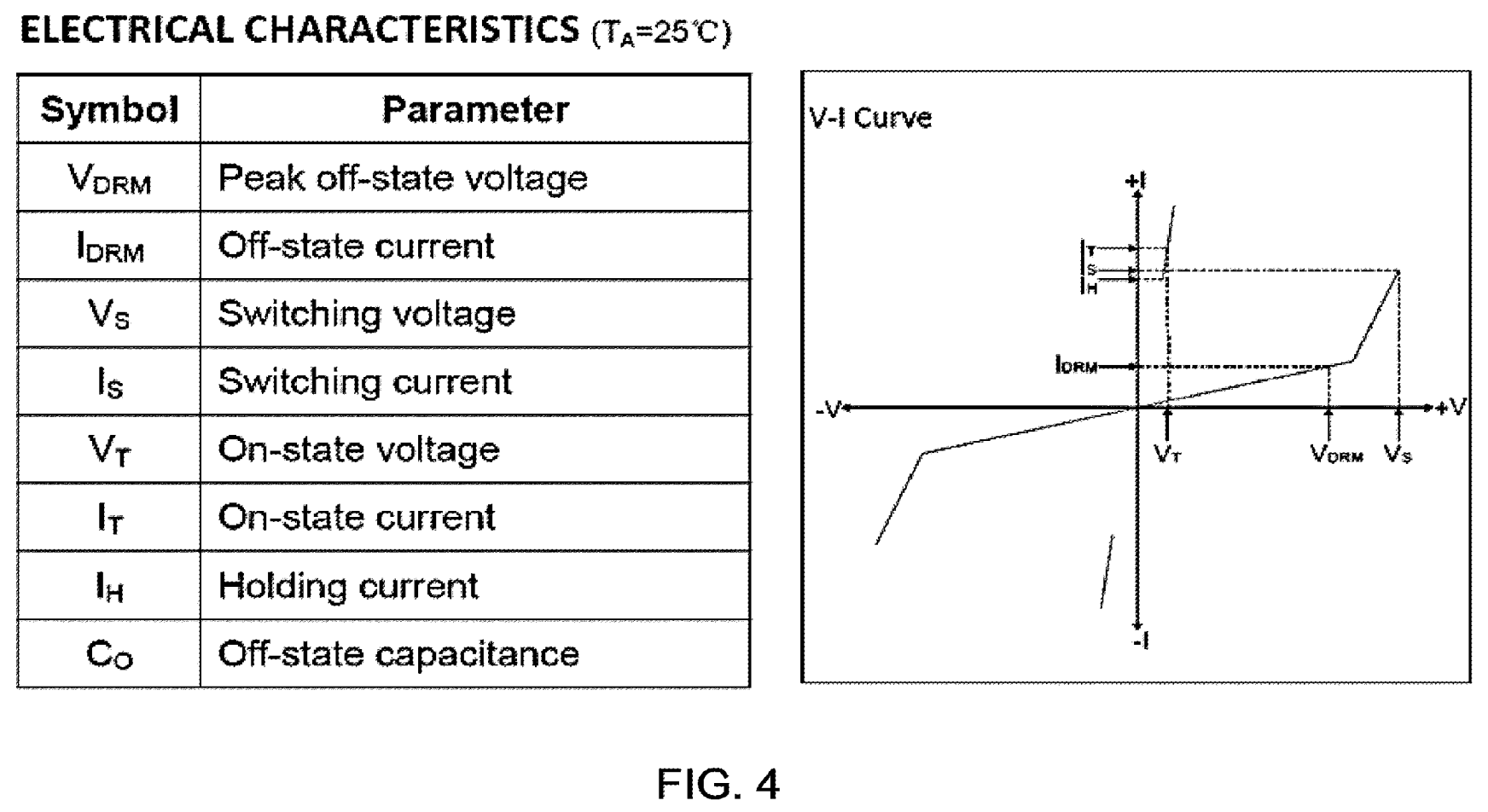

V-I Curve

ELECTRICAL CHARACTERISTICS ($T_A$=25°C)

| Symbol | Parameter |
|---|---|
| $V_{DRM}$ | Peak off-state voltage |
| $I_{DRM}$ | Off-state current |
| $V_S$ | Switching voltage |
| $I_S$ | Switching current |
| $V_T$ | On-state voltage |
| $I_T$ | On-state current |
| $I_H$ | Holding current |
| $C_O$ | Off-state capacitance |

FIG. 4

PROTECTION CIRCUIT FOR USE IN A LIGHTING CIRCUIT

CROSS-REFERENCE TO PRIOR APPLICATIONS

This application is the U.S. National Phase application under 35 U.S.C. § 371 of International Application No. PCT/EP2022/051709, filed on Jan. 26, 2022, which claims the benefit of European Patent Application No. 21172929.8, filed on May 10, 2021 and International Application No. PCT/CN2021/075623 filed on Feb. 5, 2021. These applications are hereby incorporated by reference herein.

FIELD OF THE INVENTION

This invention relates to protection circuits for use in a lighting circuit, in particular to protect against common-mode surges.

BACKGROUND OF THE INVENTION

Voltage surges have a huge destructive impact upon public lighting systems. They wear out LED drivers and distribution panels prematurely, and increase service interruptions to street lighting.

Beyond material damage to the luminaires, voltage surges caused by lightning, for example, can trigger or break protective devices in the circuit boards of street lighting distribution panels. The vulnerability of electronic lighting systems to over-voltages is widely recognized.

Surge over-voltages are spikes that can reach tens of kilovolts but last for only a few microseconds. Despite their short duration, their high energy content may cause serious problems to equipment. Surge over-voltages have two modes of circulation: differential and common. Differential mode over-voltages circulate between line conductors: line-to-line or line-to-neutral. Common-mode over-voltages appear between the line conductors and earth: for example, live-to-earth or neutral-to-earth.

A LED driver is designed to apply a constant current to a LED arrangement.

A non-isolated driver is one widely used LED topology for advantages of low cost, compact size, and high efficiency. Surge protection is a particular issue for non-isolated drivers, for example with a LED light source populated on a metal-core printed circuit board (MCPCB). In a non-isolated driver, the LED on the MCPCB is electrically coupled to the input with a magnetic barrier. As a result, the LED/MCPCB would have substantially the same voltage potential as the input. Thus, a common mode surge would be applied between the MCPCB and ground (i.e. the housing). Usually the MCPCB is placed near the housing, and there is a high parasitic capacitance of the MCPCB to the ground.

A low residual voltage, by clamping the common mode surge to a lower amplitude, is needed for common-mode surge protection because the high parasitic capacitance of the MCPCB to the ground may otherwise break down if the residual voltage is too high. Prevention of breakdown increases the complexity and hence cost of the MCPCB. Effective surge protection is required for outdoor applications.

For outdoor applications, such as road lighting, high surge protection is required for instance to 10 kV. The common-mode residual voltage should be clamped to a clamping voltage which is as low as possible, to protect LED modules during a surge event. However, the driver should also meet the required dielectric strength (hi-pot test) requirement for safety regulations, which results in a higher common-mode clamp voltage.

The hi-pot (dielectric strength) test typically involves applying a voltage of double the nominal AC RMS voltage plus 1000V, at the input of the device (e.g. luminaire). The input needs to maintain such a voltage, so does not collapse or clamp the test voltage to a lower value.

On the other hand, the surge test typically involves applying a 4 kV or 6 kV surge event at the input of the luminaire, and the luminaire needs to clamp the voltage at the input to substantially low level, otherwise the 4 KV residual voltage will be present on the lighting board (the so-called L2 board) when a non-isolated driver is used, and the L2 MCPCB cannot sustain such a high voltage. The requirement to maintain a voltage in the hi pot test and to clamp and reduce a voltage in the surge test may arise in a conflict, as will be discussed below.

U.S. Pat. No. 4,455,586 discloses a protection circuit comprising transient voltage suppressors (e.g. varistors) coupled between live and neutral lines, and a path to ground which comprises a further voltage suppressor (e.g. another varistor) and a gas discharge tube. The voltage across the further voltage suppressor again results in a high residual voltage. There is a need for a protection circuit for a lighting circuit which can meet the hi-pot safety requirement while also providing a low residual voltage during a surge protection event.

SUMMARY OF THE INVENTION

CN111276957A discloses a protection circuit which can be seen effectively as a series connection of two gas discharge tubes.

The invention is defined by the claims.

It is a concept of the invention to provide a protection circuit having a protection discharge path which combines in series a gas discharge tube component and a voltage triggering circuit. In response to a first voltage at which the voltage triggering component does not trigger, a large voltage drop is generated across the voltage triggering circuit thus maintaining the input voltage during a hi-pot test. In response to a second (larger) voltage at which the voltage triggering component is triggered, a small voltage drop is generated across the voltage triggering circuit. This reduces the residual voltage present during a surge test.

According to examples in accordance with an aspect of the invention, there is provided a protection circuit for connection between a power input and a ground, comprising:

a voltage clamping circuit having an output node; and a discharge circuit connected between the output node and the ground, the discharge circuit comprising, in series:

a gas discharge tube component; and a controllable voltage triggering circuit with a triggering threshold;

wherein the controllable voltage triggering circuit is adapted to:

conduct a first current and provide a first voltage drop in response to a first voltage difference between the power input and ground, wherein the first voltage difference is insufficient to provide a voltage across the controllable voltage triggering circuit which reaches the triggering threshold; and conduct a second current, greater than the first current, and break down to provide a low, second voltage drop, in response to a second voltage difference between the power input and ground which is greater than the first voltage difference and sufficient to provide a voltage across the controllable voltage triggering circuit which reaches the triggering threshold.

This circuit is a common-mode surge protection circuit. The first voltage is for example applied during a high pot test and the second voltage difference is applied during a surge test. The power input typically has multiple terminals (e.g. live and neutral) and the test may be applied between any one of the terminals and the ground.

The aim is to meet the requirement to maintain the input voltage in the hi-pot test requirement while enabling clamping of the voltage to a lower residual voltage during a surge protection test. This means it is possible to choose a lower breakdown voltage of the components downstream of the protection circuit, such as a printed circuit board. A lower parasitic current passes through such a printed circuit board during a current surge event. This gives lower cost and higher thermal performance of the printed circuit board.

A low voltage rating gas discharge tube component may be used, with smaller voltage variance range. The remaining voltage can be taken by the added controllable voltage triggering circuit. The added controllable voltage triggering circuit enables a high impedance to be maintained for the hi-pot test, during which neither part of the discharge circuit is triggered, hence the current is small and the controllable voltage triggering circuit is maintained with high impedance. For the surge test voltage, the voltage triggers the gas discharge tube as well as the controllable voltage triggering circuit, which both become low impedance, so the voltage in the surge test is clamped by the remaining voltage clamping circuit to a safe level.

The discharge circuit in this way implements a small current flow path which is adapted to conduct a small current while maintaining a high voltage across the controllable voltage triggering circuit, but not greater than the triggering threshold. This small current flow path is used during the hi-pot test.

The discharge circuit also implements a conduction path adapted to make the controllable voltage triggering circuit conductive such that the voltage across the controllable voltage triggering circuit becomes low when the controllable voltage triggering circuit reaches the triggering threshold. This conduction path is used during the surge test.

The first voltage difference is for example equal to double a nominal RMS AC voltage to be received at the power input plus 1 kV, optionally for a hi-pot test, and none of the voltage clamping circuit, the controllable voltage triggering circuit or the gas discharge tube is adapted to be triggered under this first voltage difference. This is a typical hi-pot test voltage.

The second voltage difference may be 4 kV or greater, optionally for a surge test, and the controllable voltage triggering circuit and the gas discharge tube are adapted to break down with substantially zero voltage drop under this second voltage difference, and the voltage clamping circuit is adapted to be triggered and clamp the voltage between the power input and ground. This is a typical surge test voltage.

The gas discharge tube component may have a spark-over nominal voltage in a range of 500V to 800V with a tolerance of around +/−20% such that its maximum possible spark-over voltage, equal to the nominal voltage plus an additional voltage of 100 to 160V (20% of 500V to 800V), will be reached when the second voltage difference is applied. This may be a lower voltage component than the component used in existing circuits. For example, a typical gas discharge tube component used in this context has a spark-over nominal voltage of 2 kV or above, with the tolerance of +/−20%. Thus, there is a risk that the gas discharge tube's trigger voltage, equal to 2 kV plus an additional voltage of 400V (20% of 2 kV), is so high that it will not be triggered by the surge voltage, such that the surge voltage would not be clamped down and leave a high residual voltage to the downstream circuit.

The voltage clamping circuit may be adapted to clamp the voltage at the output node to a clamping voltage value in the range 750V to 1.5 kV when the voltage clamping circuit is triggered. The clamping voltage is for example around 1 kV.

The triggering threshold of the controllable voltage triggering circuit is for example in the range 100V to 400V above the clamping voltage. The triggering threshold is for example around 1.2 kV.

The voltage clamping circuit for example comprises first and second voltage dependent resistors in series, to be between live and neutral lines of the power input, with the output node at the junction between them. Thus, since the common mode surge may happen between either of the live or the neutral lines and the ground, the voltage clamping circuit can handle both cases. The output node voltage is clamped by the voltage dependent resistors.

The first and second voltage dependent resistors may each have a parallel capacitor. These capacitors are used to influence the rate of change of current, in particular to speed up break down of the controllable voltage triggering circuit.

The gas discharge tube component is for example adapted to spark (i.e. break down) and thereby cause the controllable voltage triggering circuit to break down and provide the second voltage drop which is close to zero, in response to the second voltage difference.

In a first example, the controllable voltage triggering circuit comprises a SiDAC component and the gas discharge tube component becomes conductive in response to the second voltage difference, thereby to trigger the SiDAC component. This is a first option for implementing the controllable voltage triggering circuit.

In a second example, the controllable voltage triggering circuit comprises a second gas discharge tube component with a parallel resistive path. This is a second option for implementing the controllable voltage triggering circuit.

The resistive path is for example sized such that the voltage across the resistive path when the first voltage difference is applied is lower than the triggering threshold, and the voltage across the resistive path when the second voltage difference is applied reaches the triggering threshold to provide sparking (i.e. break down) of the second gas discharge tube component.

The invention also provides a lighting driver comprising:
a mains input;
the protection circuit as defined above;
a rectifier connected to the mains input; and
a driver circuit supplied by the output of the rectifier.
The driver circuit is for example a non-isolated driver.
The invention also provides a lighting circuit comprising:
the lighting driver defined above; and
a LED module driven by the lighting driver, said LED module comprising a metal core printed circuit board having a parasitic capacitance to the ground.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 4 shows the V-I characteristic curve of a SiDAC;

DETAILED DESCRIPTION OF THE EMBODIMENTS

Figure 1:
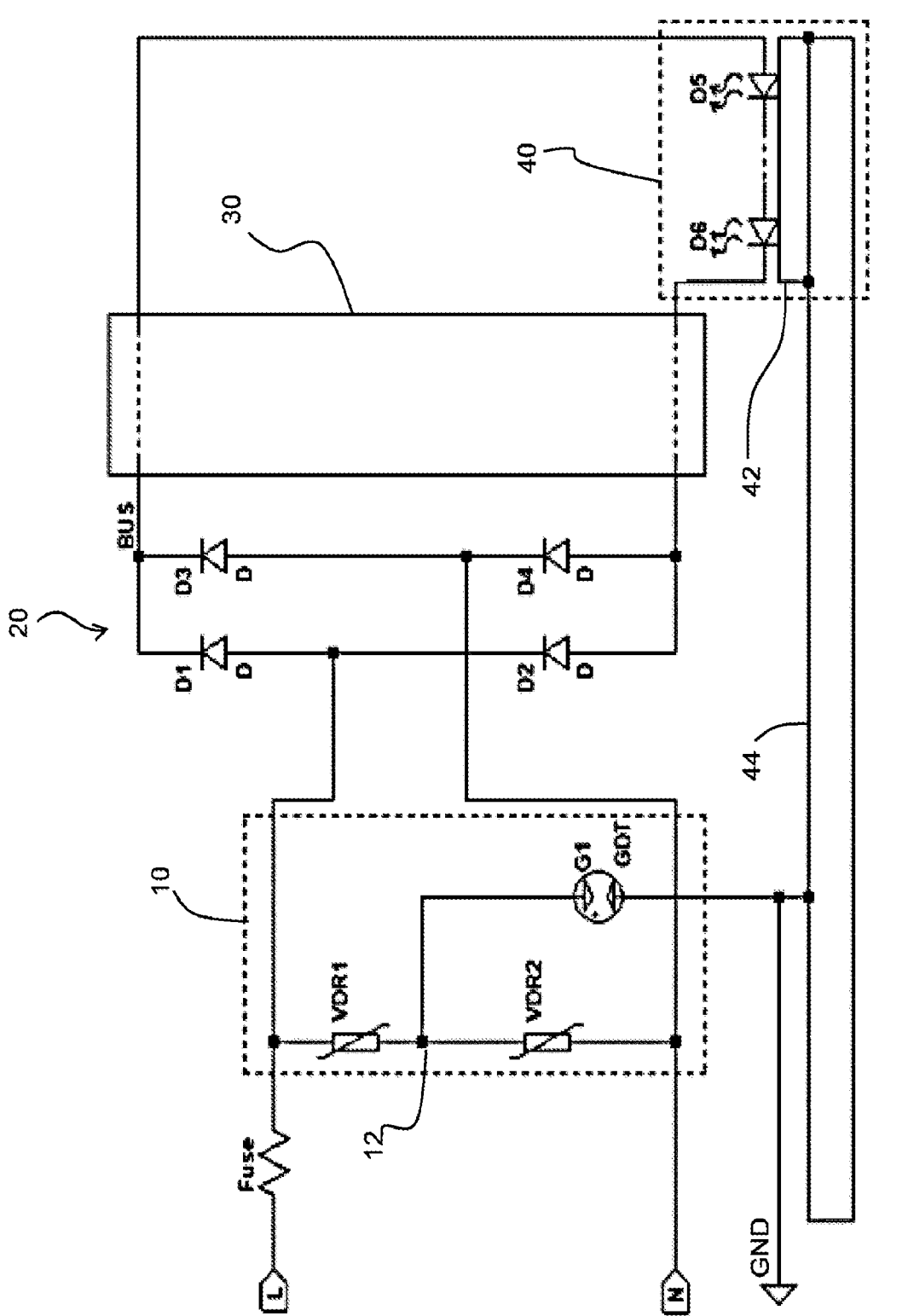
FIG. 1 shows a basic schematic diagram of a known common-mode surge protection circuit for protecting a non-isolated driver.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a protection circuit comprising a voltage clamping circuit and a discharge circuit connected between the voltage clamping circuit and a ground. The discharge circuit has, in series, a gas discharge tube component and a controllable voltage triggering circuit with a triggering threshold. A hi-pot test voltage is insufficient to trigger the voltage triggering circuit and a low current is then conducted. A surge test voltage is sufficient to break down the voltage triggering circuit to provide a low voltage drop and a large current flows.

FIG. 1 shows a basic schematic diagram of a known common-mode surge protection circuit for protecting a non-isolated driver.

FIG. 1 shows a protection circuit 10 connected between a power input (the live voltage L and neutral voltage N of a mains supply) and a ground, noted by GND.

The output of the protection circuit connects to the input of a diode rectifier 20, and the rectified output supplies a non-isolated driver 30. The load for the driver 30 is a LED module 40 mounted on a metal core PCB 42. The PCB 42 is mounted on a metallic heatsink 44. The PCB 42 and the heatsink 44 are electrically insulated but there is still a parasitic capacitance between them.

The protection circuit 10 comprises a voltage clamping circuit between the live and neutral lines L, N. It comprises two voltage dependent resistors (VDRs, i.e. varistors) VDR1 and VDR2 in series, with an output node 12 between them. The output node 12 connects to ground through a gas discharge tube (GDT) component G1.

This is a basic circuit for common-mode surge protection. The varistors VDR1 and VDR2 are used to clamp a surge voltage and limit surge current when a surge event happens. The GDT component G1 is used to provide a low impedance path to ground/earth when the common-mode surge happens but a high impedance, to maintain low leakage current within safety requirements, for normal operation.

A dielectric strength (hi-pot) test between live L and earth and/or between neutral N and earth is required with a voltage 2U+1 kV to provide basic insulation, where U is the nominal RMS input voltage. For a driver with a typical mains nominal input voltage of 220V to 240V, the hi-pot test voltage will be 1480Vac.

The hi-pot requirement is for example met if a breakdown current is less than 100 mA for a luminaire, although typically a value of 10 mA may be set to ensure product safety.

To meet this requirement, there are two options for the design of the circuit components of the protection circuit:

(i) A DC spark-over voltage (i.e. the break-down voltage) of the gas discharge tube component is set higher than the DC peak of the hi-pot test voltage i.e. 1480× $\sqrt{2}$=2093Vdc. The GDT component typically has a +/−20% tolerance for this voltage, so for a 2093V application, the GDT component needs a DC spark-over voltage of at least 2093V÷0.8=2616V, so a component with a spark-over voltage of 2.7 kV may be selected.

According to a typical GDT component specification, the impulse spark-over voltage under a surge event will then be in the range 3.6 kV to 4 kV.

By adding the residual voltage of the VDR which is in the circuit path, the total residual voltage could be higher than 4 kV if a 6 kV common surge happens. This means a 4 kV surge voltage may still exist since the GDT may not be triggered by it. If a residual voltage greater than 4 kV may arise, this residual voltage would exist between the MCPCB and the heatsink. In order to avoid break down of the MCPCB, this high residual voltage limits the MCPCB selection. Thus, due to the tolerance of the GDT component, if the rating of the GDT component is selected too high, the corresponding amount of voltage variation becomes large and the maximum possible voltage may not be reached and the GDT will not break down when the surge event arises. Hence, the PCB 42 has to withstand the high voltage.

If the spark-over voltage of the GDT component is selected to be lower, the hi-pot test could mistrigger the GDT component, and the luminaire may then not be able to maintain the hi-pot test voltage.

(ii) A DC spark-over voltage of the GDT component may instead be selected to be lower than 1480× $\sqrt{2}$=2093Vdc. Because of the very low capacitance compared with VDR1 and VDR2, the hi-pot voltage is applied to the GDT component first. When the voltage reaches DC spark-over voltage of the GDT component, the impedance is transitioning from high to low or negative, corresponding to a transition from the glow state to the arc state in the V-I characteristic curve.

The current during the hi-pot test cannot be limited by the GDT component. To meet the hi-pot requirement, the clamping voltage of VDR1 and VDR2 should therefore be higher than 1480× $\sqrt{2}$=2093Vdc, which limits the breakdown current of hi-pot test below 1 mA.

If a VDR clamping voltage is selected around 2.2 kV, the residual voltage under a typical 8/20 μs surge is around 2.2 kV×1.65=3520V. Thus, the total residual voltage will be higher than 3520V when a common surge event arises. Thus, the same issue arises as above, that the GDT component may not break down when the surge event arises and hence the PCB 42 has to withstand the high voltage.

With both design options, the need for a high breakdown voltage for the MCPCB results in a higher cost and lower thermal performance of the MCPCB and a risk of damaging electronic components on the MCPCB during the surge event, due to a higher parasitic current passing through the MCPCB.

Figure 2:
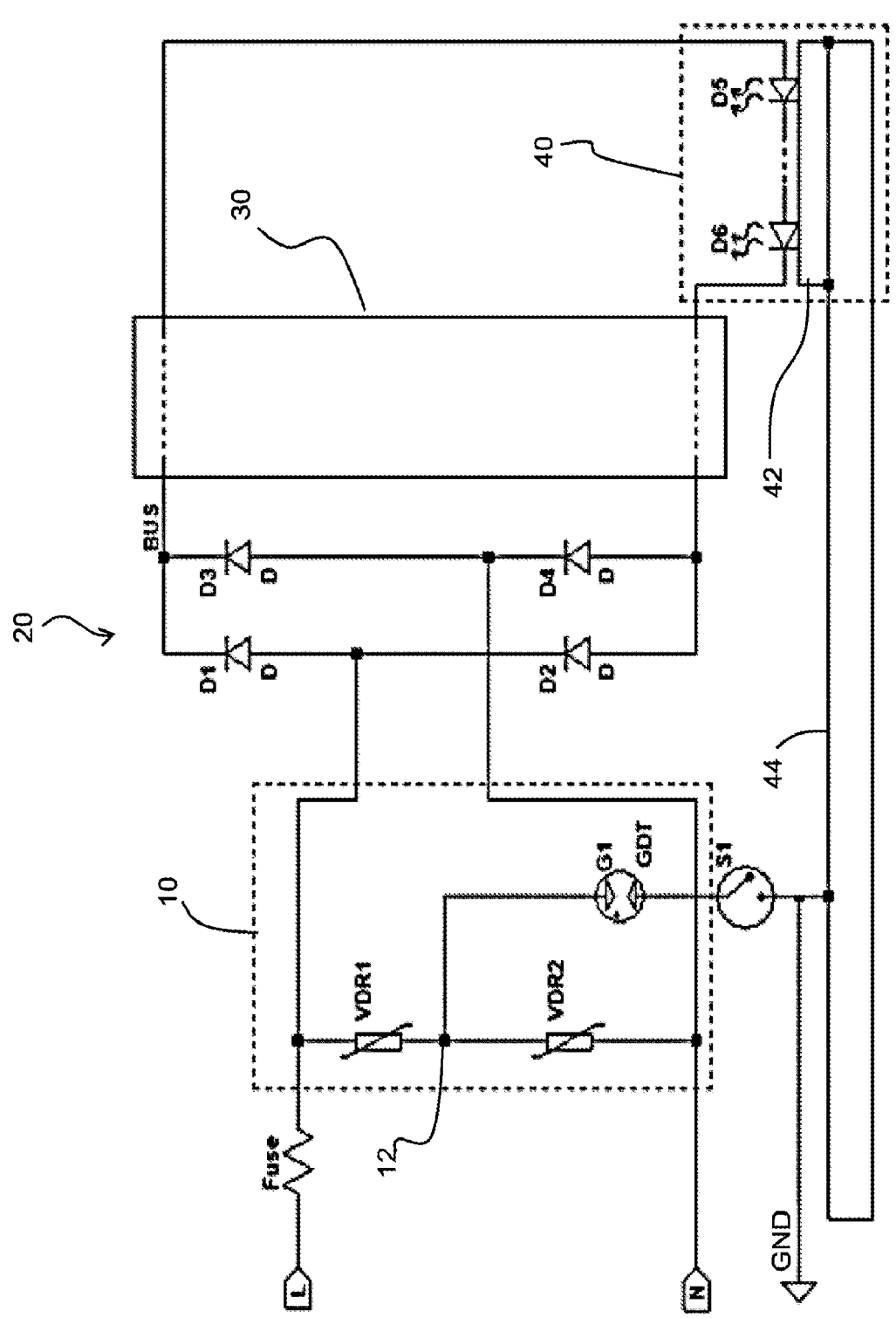
FIG. 2 shows the use of a switch or a detachable screw in series along the discharge path to ground.

In order to achieve a low common-mode residual voltage during a surge test while satisfying the dielectric strength test, it is known to add a switch or a detachable screw S1 as shown in FIG. 2, in series along the discharge path to ground. The GDT component is made open circuit by removing the screw S1 when the hi-pot test is carried out and is closed (by locking the screw) when hi-pot test is finished. However, this solution is no longer permitted by standards.

Figure 3:
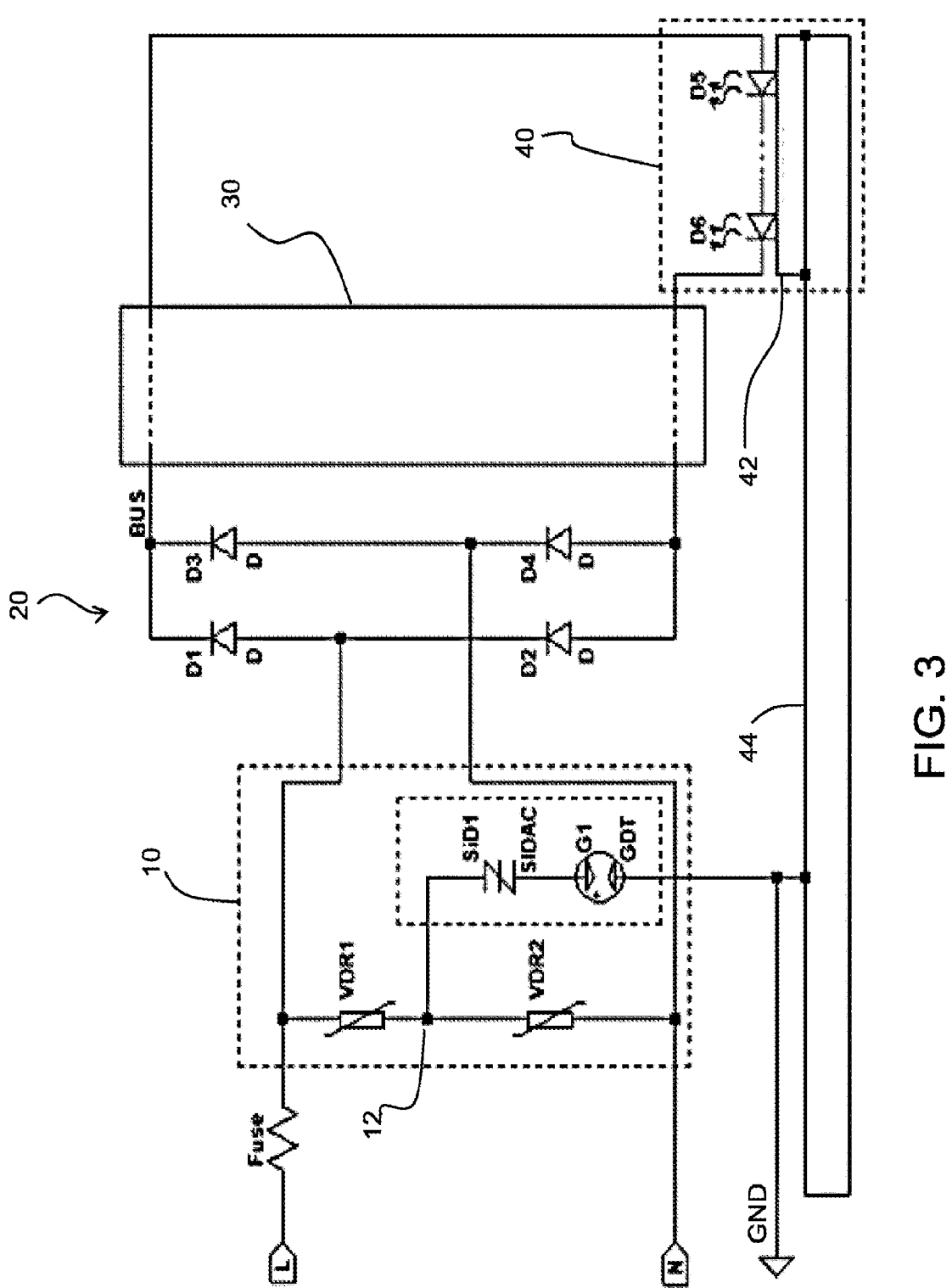
FIG. 3 shows a circuit in accordance with a first example of the invention.

FIG. 3 shows a circuit in accordance with a first example of the invention. The same reference numbers are used in FIG. 3 and all subsequent figures as in FIGS. 1 and 2, for the same components.

The protection circuit is again for connection between a power input (which for example comprises two terminals) and a ground GND, and comprises the voltage clamping circuit of the first and second voltage dependent resistors VDR1 and VDR2 with an output node 12, and a discharge circuit connected between the output node 12 and the ground.

The discharge circuit comprises, in series, the gas discharge tube component G1 generally as discussed above (but with lower rating, to be discussed below), and an additional controllable voltage triggering circuit SiD1, with a triggering threshold. The controllable voltage triggering circuit has an impedance characteristic which depends on the voltage across the component, and in particular it shows a decrease in impedance when a threshold voltage (i.e. a break-down voltage) is reached. Thus, before break down it may present a high impedance, suitable for preventing dielectric breakdown. After break down it may present a low impedance and hence a low voltage drop such that it will no longer take a high voltage and allow the voltage clamping circuit to clamp a small voltage and prevent a large residual voltage.

The low voltage drop is for example close to zero (relative to the other voltages present) and for example may be ones or tens of volts.

In the example of FIG. 3, the controllable voltage triggering circuit is a DIAC, in particular a SiDAC (a silicon diode for alternating current). The diode only conducts current after its breakdown voltage. When breakdown occurs, the diode enters a region of negative dynamic resistance leading to a decrease in voltage drop across the diode, and an increase in current. A SiDAC has a high breakdown voltage and a large current carrying capacity.

The SIDAC has an extremely low off-state current such as IDRM<200 μA.

During a hi-pot test, with a first voltage difference between the power input (i.e one of the lines L and N) and ground, a first current is conducted and a first voltage drop is generated, before the breakdown of the SiDAC. The first current is the off-state current, and is for example less than 1 mA, for example less than 500 μA, for example less than 200 μA. This low current is caused by the parasitic capacitance of the SiDAC as well as the gas discharge tube.

During the hi-pot test, none of the voltage clamping circuit, or the controllable voltage triggering circuit is adapted to be triggered under this first voltage difference.

During a surge test, with a larger second voltage difference (e.g. 4 kV or more) between the power input and ground, the parasitic capacitance of the SiDAC and the gas discharge tube is no longer enough to limit the current and voltage division on them, the gas discharge tube would break down, then the SiDAC undergoes breakdown, so that a larger second current is conducted, and a second substantially low voltage drop is generated.

During the surge test, the controllable voltage triggering circuit and the gas discharge tube are adapted to break down with near to zero voltage drop under this second voltage difference. The voltage clamping circuit is triggered and clamps the voltage between the power input and ground.

The DC spark-over voltage of the GDT component G1 is selected to be lower than $1480 \times \sqrt{2} = 2093$Vdc for instance 600Vdc.

FIG. 4 shows the V-I characteristic curve of the SiDAC. A high impedance is provided before the current reaches the switching current Is.

A low voltage close to the on-stage voltage VT is present across the SiDAC after break down. This is of the order of ones or tens of volts, e.g. in the range 1V to 10V.

As a result of this high impedance, the clamping voltage of VDR1 and VDR2 can be lower (than in the prior solution (ii) explained above).

In particular:

At first: V_VDR1+V_VDR2> mains voltage.

Then: V_VDR1 (or V_VDR2)+V_SiD1>1480× $\sqrt{2}$=2093Vdc.

Note that V_SiD1 refers to the peak off state voltage shown as VDRM in FIG. 4. V_VDR1 (or V_VDR2) refers to the clamping voltage of the respective VDR.

The VDR has as high parasitic capacitance, whereas the SiDAC and GDT component have small parasitic capacitance. Thus, there is very low leakage current. The leakage current can thus easily be maintained below 10 mA when performing the hi-pot test.

During protection of a surge event, the SiDAC will break down resulting in a low impedance. A lower clamping voltage will be achieved than in the known circuits as a result of the lower clamping voltages of VDR1 and VDR2. A lower spark-over voltage of the GDT component is also is selected.

For example, the clamping voltages V_VDR1 and V_VDR2 may be selected as 1 kV. More generally, the voltage clamping circuit (i.e. each of VDR1 and VDR2) may clamp the voltage at the output node to a clamping voltage value in the range 750V to 1500V when the voltage clamping circuit is triggered.

V_SiD1 is for example selected as 1200V. More generally, the triggering threshold of the controllable voltage triggering circuit is in the range 100V to 400V above the clamping voltage.

The GDT component may have a spark-over voltage of 600V. More generally, the GDT component for example has a spark-over nominal voltage in a range of 500V to 800V with a tolerance such that its maximum possible spark-over voltage will be reached when the second voltage difference is applied. This may be a lower voltage component than that used in existing circuits. For example, a typical gas discharge tube component has a spark-over voltage of 2 kV or above.

The residual voltage arising during a common-mode surge is mainly dependent on the surge current through the VDR. Using a 10 kV common surge as reference, a residual voltage of around 1.8 kV to 2.2 kV may be present using the same assumptions as in the examples above, thus representing a 60% reduction compared to the known solutions explained above.

Figure 5:
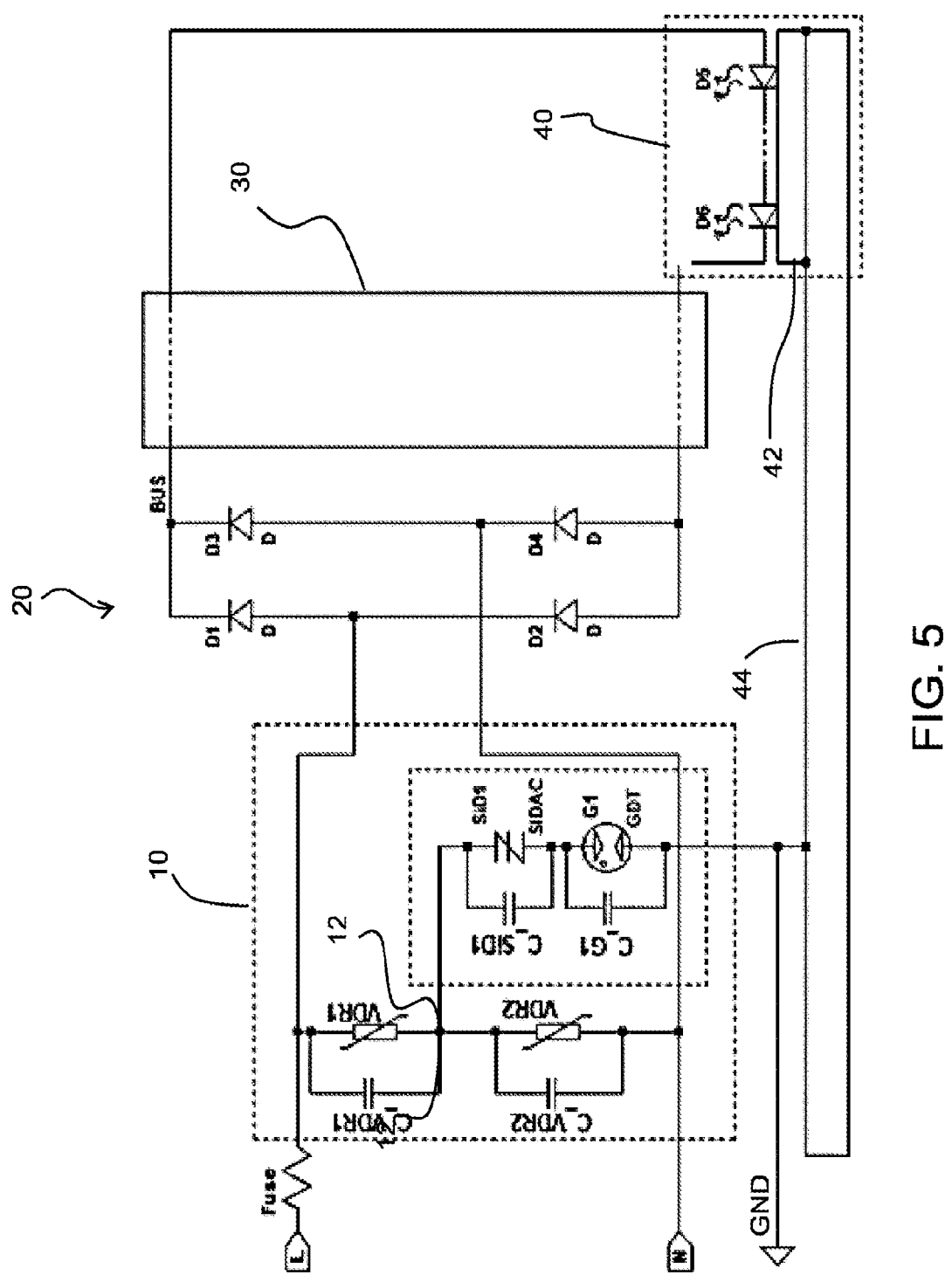
FIG. 5 shows the capacitances of the components of FIG. 3 to explain further the currents and voltages arising.

FIG. 5 shows the capacitances of the components of FIG. 3 to explain further the currents and voltages arising. The VDRs each have a parasitic parallel capacitance C_VDR1 and C_VDR2, the SiDAC has a parallel capacitance C_SID1 and the GDT component has a parallel capacitance C_G1.

When a surge voltage is applied added between the live line L or neutral line N to earth, the parasitic capacitances C_G1, C_SiD1, C_VDR1 or C_VDR2 are in-series, so the voltage is divided according to the capacitances, because of the very short rise time.

Typically, the value of the parasitic capacitance C_VDR and C_SiD1 are both larger than C_G1. This means the GDT component will be on at first, when the series branch current exceeds the switching current of the SiDAC. According to di=CaU/at, the initial switching current can be determined under a surge test.

The SiDAC will turn on second and will keep a low clamping voltage. The VDR component will quickly be triggered.

Finally, the surge current passes through the VDRs and SiDAC and GDT component to result in a low residual voltage. The circuit is thereby able to meet the hi-pot safety requirement while enabling a lower residual voltage during a surge protection test. This means a lower breakdown voltage of the components downstream of the protection circuit, such as a printed circuit board, is possible. A lower parasitic current passes through such a printed circuit board during a current surge event. This gives lower cost and higher thermal performance.

Figure 6:
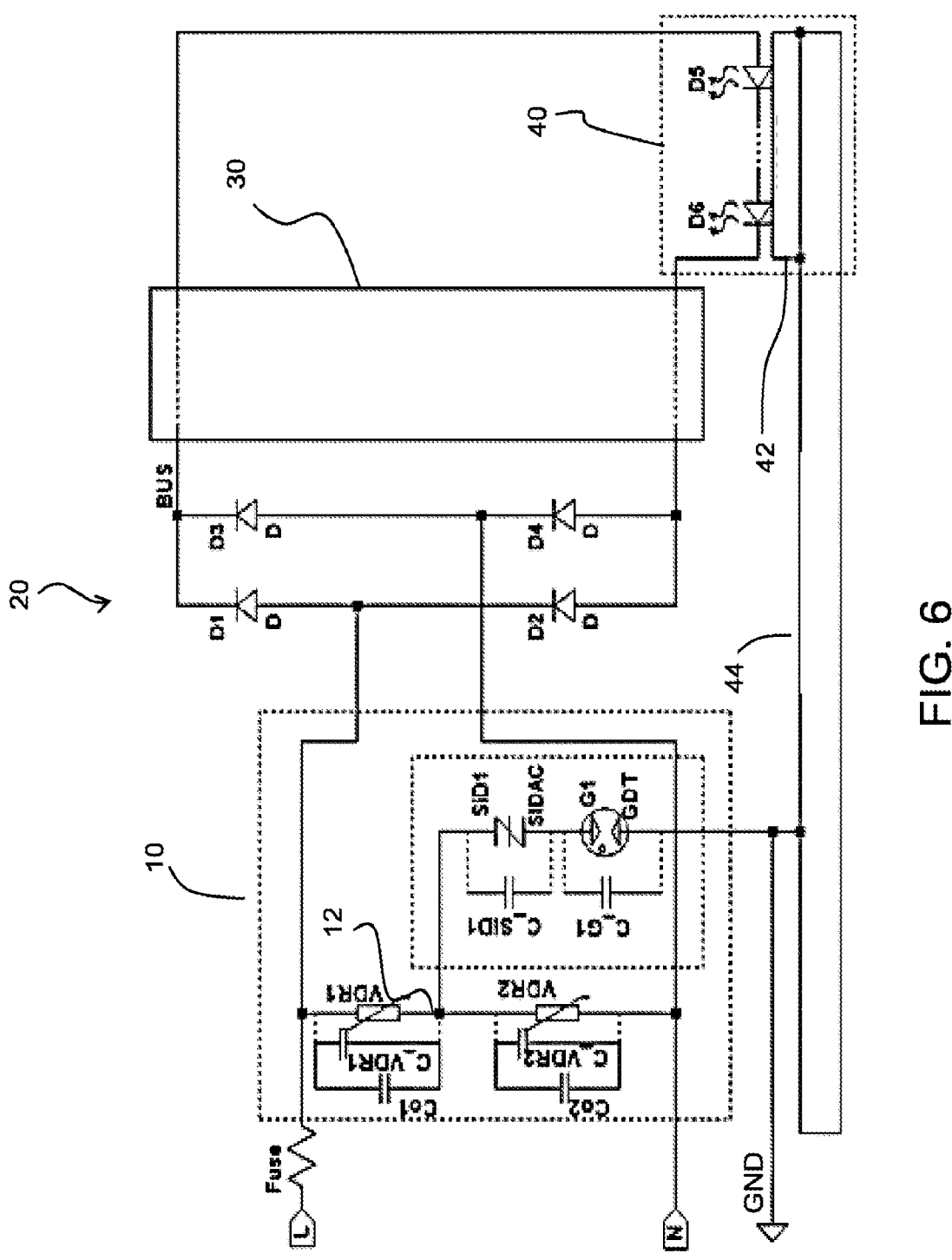
FIG. 6 shows a modification to the circuit of FIG. 5 in which the varistors VDR1 and VDR2 have an additional parallel capacitor added.

FIG. 6 shows a modification to the circuit of FIG. 5 in which the varistors VDR1 and VDR2 have an additional parallel capacitor added, Co1 and Co2. These are provided to better control the break down process. This increases the current through the discharge path, to speed up break down of the SiDAC.

Figure 7:
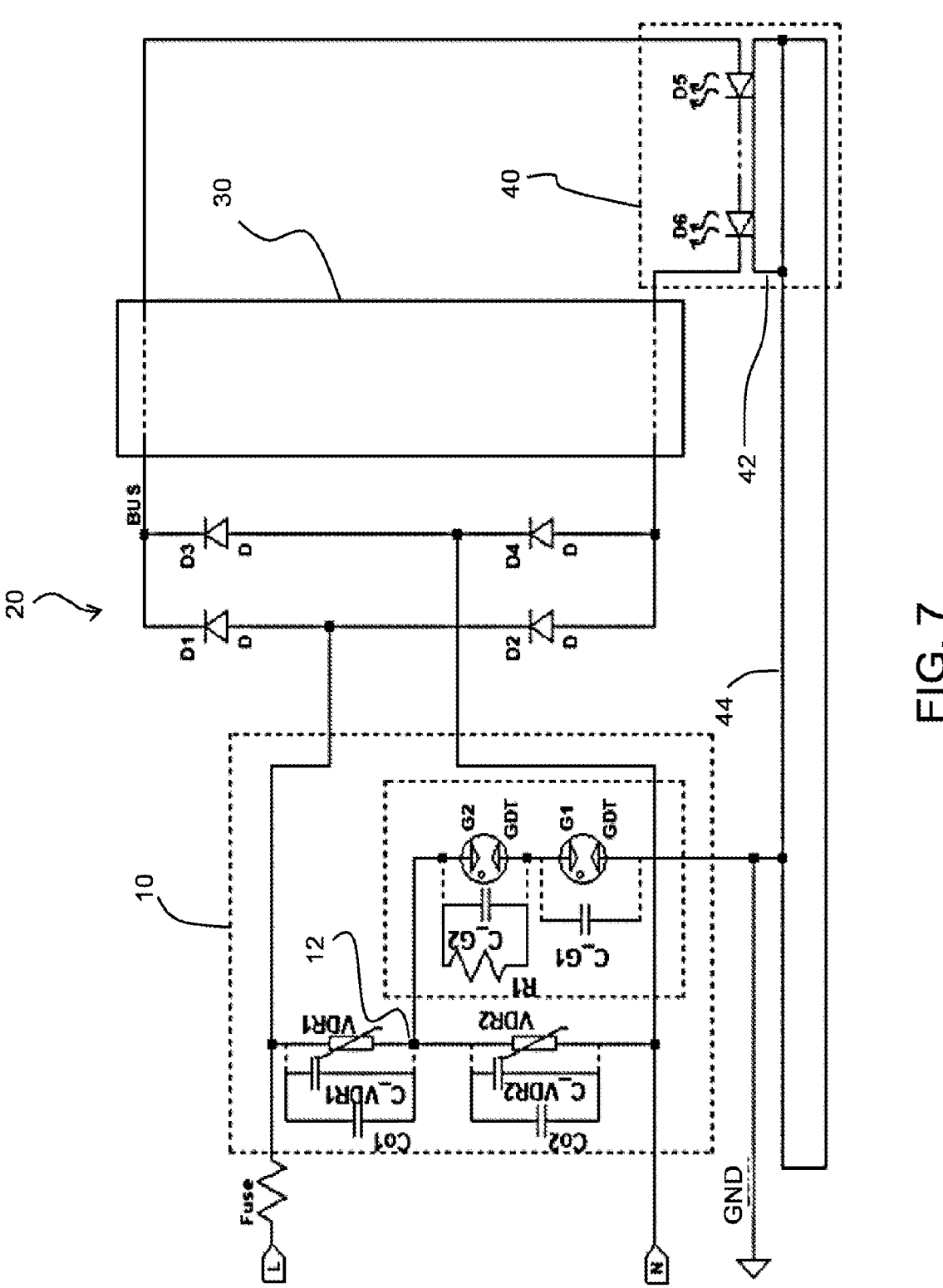
FIG. 7 shows a circuit in accordance with a second example of the invention.

The examples above make use of a SiDAC as a controllable voltage triggering circuit. FIG. 7 shows an alternative in which the SiDAC is replaced by a combination of a second GDT component G2 with a parallel resistive path, represented as a resistor R1. The resistive path R1 is sized such that the voltage across the resistive path when the first voltage difference is applied is lower than the triggering threshold, and the voltage across the resistive path when the second voltage difference is applied reaches the triggering threshold to provide break down of the second gas discharge tube component G2.

When the hi-pot test is performed, because of the small value of the parasitic capacitance and slow rate of change of voltage, a low current will flow through the resistor R1 and hence the voltage across the resistor R1 will be lower than the spark-over voltage of G2. Thus, the hi-pot test conditions are met.

When a surge event happens, the rise time of the surge voltage is quite short, so the surge current will flow through the parasitic capacitance C_VDR1 or C_VDR2 (and optionally the additional capacitor Co1 or Co2). The surge current is higher, so quickly the voltage across the resistor R1 will reach the spark-over voltage of the second GDT component G2, which then enters the arcing mode to trigger the VDR to maintain a low clamping voltage.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A protection circuit for connection between a power input and a ground, comprising:
   a voltage clamping circuit connected to the power input and having an output node; and
   a discharge circuit connected between the output node and a ground, the discharge circuit comprising:
       a gas discharge tube component; and
       a controllable voltage triggering circuit with a triggering threshold of 850V to 1.9 kV, wherein the controllable voltage triggering circuit is in series connection with the gas discharge tube component and comprises a SiDAC component;
   wherein the controllable voltage triggering circuit is configured to conduct a first current and provide a first voltage drop in response to a first voltage difference for a hi-pot test between the power input and ground, wherein the first voltage difference is insufficient to provide a voltage across the controllable voltage triggering circuit which reaches the triggering threshold; and
   the gas discharge tube component is configured to become conductive in response to a second voltage difference for a surge test between the power input and ground thereby to trigger the SiDAC component such that the SiDAC component conducts a second current, greater than the first current, and break down to provide a low, second voltage drop close to zero, in response to the second voltage difference between the power input and ground which is greater than the first voltage difference and sufficient to provide a voltage across the controllable voltage triggering circuit which reaches the triggering threshold.

2. The protection circuit of claim 1, wherein:
   the first voltage difference for a hi-pot test is equal to double a nominal RMS AC voltage to be received at the power input plus 1000V; and
   none of the voltage clamping circuit, the controllable voltage triggering circuit or the gas discharge tube is adapted to be triggered under this first voltage difference.

3. The protection circuit of claim 1, wherein:
   the second voltage difference for a surge test is 4 kV or greater; and
   the controllable voltage triggering circuit and the gas discharge tube are adapted to break down with zero voltage drop under this second voltage difference, and the voltage clamping circuit is adapted to be triggered and clamp the voltage between the power input and ground.

4. The protection circuit of claim 3, wherein the gas discharge tube component has a spark-over nominal voltage in a range of 500V to 800V with a tolerance, such that its maximum possible spark-over voltage, equal to the nominal voltage plus a maximum voltage variation due to the tolerance, will be reached when the second voltage difference is applied.

5. The protection circuit of claim 4, wherein the voltage clamping circuit is adapted to clamp the voltage at the output node to a clamping voltage value in the range 750V to 1.5 kV when the voltage clamping circuit is triggered.

6. The protection circuit of claim 5, wherein the triggering threshold of the controllable voltage triggering circuit is in the range 100V to 400V above the clamping voltage.

7. The protection circuit of claim 1, wherein the voltage clamping circuit comprises first and second voltage dependent resistors in series to be between live and neutral lines of the power input, with the output node at the junction between them.

8. The protection circuit of claim 7, wherein the first and second voltage dependent resistors each have a parallel capacitor.

9. A lighting driver comprising:

a mains input;

the protection circuit of claim 1 to be connected to the mains input and a ground;

a rectifier connected to the mains input; and a driver circuit supplied by the output of the rectifier.

10. The lighting driver of claim 9, wherein the driver circuit is a non-isolated driver.

11. A lighting circuit comprising:

the lighting driver of claim 9; and a LED module driven by the lighting driver, said LED module comprising a metal core printed circuit board having a parasitic capacitance to the ground.

* * * * *